United States Patent [19]

Trombly

[11] 4,047,633

[45] Sept. 13, 1977

[54] ICE CONTAINER

[75] Inventor: Edgar F. Trombly, Grosse Pointe Farms, Mich.

[73] Assignee: Dart Industries Inc., Los Angeles, Calif.

[21] Appl. No.: 726,076

[22] Filed: Sept. 23, 1976

[51] Int. Cl.² .................. B65D 13/02; B65D 25/18
[52] U.S. Cl. .................................. 220/9 R; 40/312; 220/17; 220/63 R; 220/82 R
[58] Field of Search ............... 220/9 R, 10, 17, 63 R, 220/65, 70, 72, 82 R; 40/306, 310, 312, 324

[56] References Cited

U.S. PATENT DOCUMENTS

| | | | |
|---|---|---|---|
| 2,596,881 | 5/1952 | White | 220/70 X |
| 2,781,650 | 2/1957 | Lee | 40/324 |
| 2,834,130 | 5/1958 | Nelson | 40/312 |
| 2,885,107 | 5/1959 | Bliss | 220/17 |
| 3,524,564 | 8/1970 | Schurman | 220/82 R X |
| 3,623,580 | 11/1971 | Toller | 220/63 R X |
| 3,737,093 | 6/1973 | Amberg et al. | 220/9 R X |
| 3,776,413 | 12/1973 | Myers | 220/9 R |

FOREIGN PATENT DOCUMENTS

| | | | |
|---|---|---|---|
| 959,341 | 5/1964 | United Kingdom | 220/9 R |

*Primary Examiner*—Stephen Marcus
*Attorney, Agent, or Firm*—Kenneth J. Hovet

[57] ABSTRACT

A double walled insulated container comprising an outer housing having a bottom with integral upstanding peripheral walls with a corresponding inner container having a bottom and integral upstanding peripheral walls. The inner container is provided with a rim structure having a channel formed on its underside. The channel functions to locate the inner container bottom and peripheral walls in a spaced-apart relationship from corresponding surfaces in the housing. Decoratve material is placed between the spaced-apart walls and the inner container and housing are bonded together at their upper edges to form a decorative unitary insulated container. A lid is provided for the container.

5 Claims, 8 Drawing Figures

ICE CONTAINER

BACKGROUND OF THE INVENTION

1. Field of the Invention

The present invention relates to insulated containers and, more particularly to a double wall insulated container with decorative material sealed between the walls of the container.

2. Description of the Prior Art

In general, the prior art shows various double walled insulated containers, some of which have decorative material positioned between opposing side walls.

U.S. Pat. No. 2,538,524 discloses an insulated container wherein the inner liner is sealed to an outer housing with an annular tongue and groove connection. A container having transparent outer walls is shown in U.S. Pat. No. 3,776,413. These patents are unlike the present structure in that they lack the unique rim structure having a rib projection for positioning a decorative insert. Additionally, they omit the double walled transparency which greatly enhances the appeal of the present container.

The advantage of the present invention over the prior art is that the prior art containers were quite complex in their construction and lacked aesthetic appeal. The decorative material used in the present invention may be illustrations of ships, animals and the like, and due to the transparency of the side walls of the container and the fact that the decorative material is printed on a transparent plastic sheet, the contents of the container provide an aesthetically appealing background for the decorative material. This is particularly true when the present invention is used as an ice container.

DESCRIPTION OF THE PREFERRED EMBODIMENTS

Figure 1:
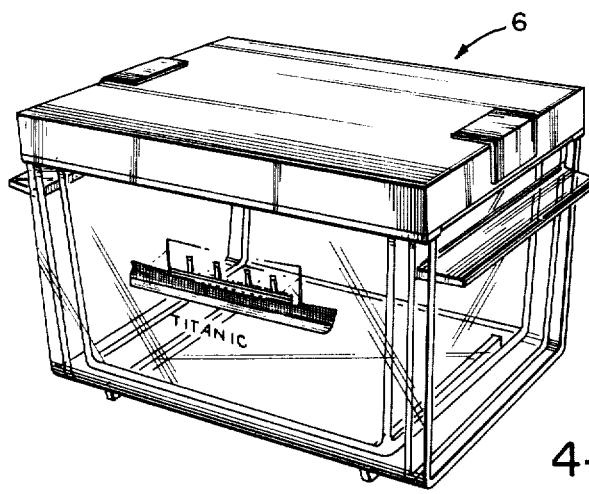
FIG. 1 is a front perspective view of the container of the present invention.
Figure 2:
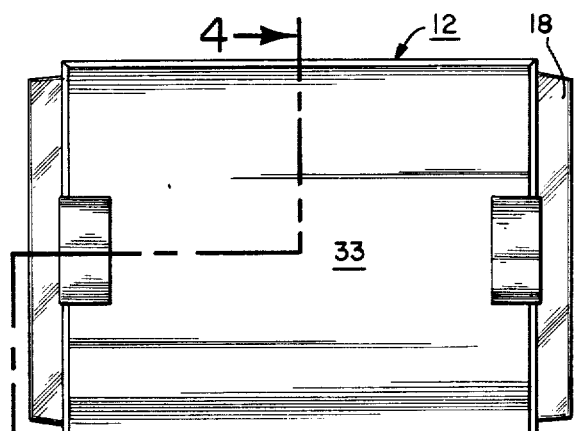
FIG. 2 is a top plan view of the container of the present invention.
Figure 3:
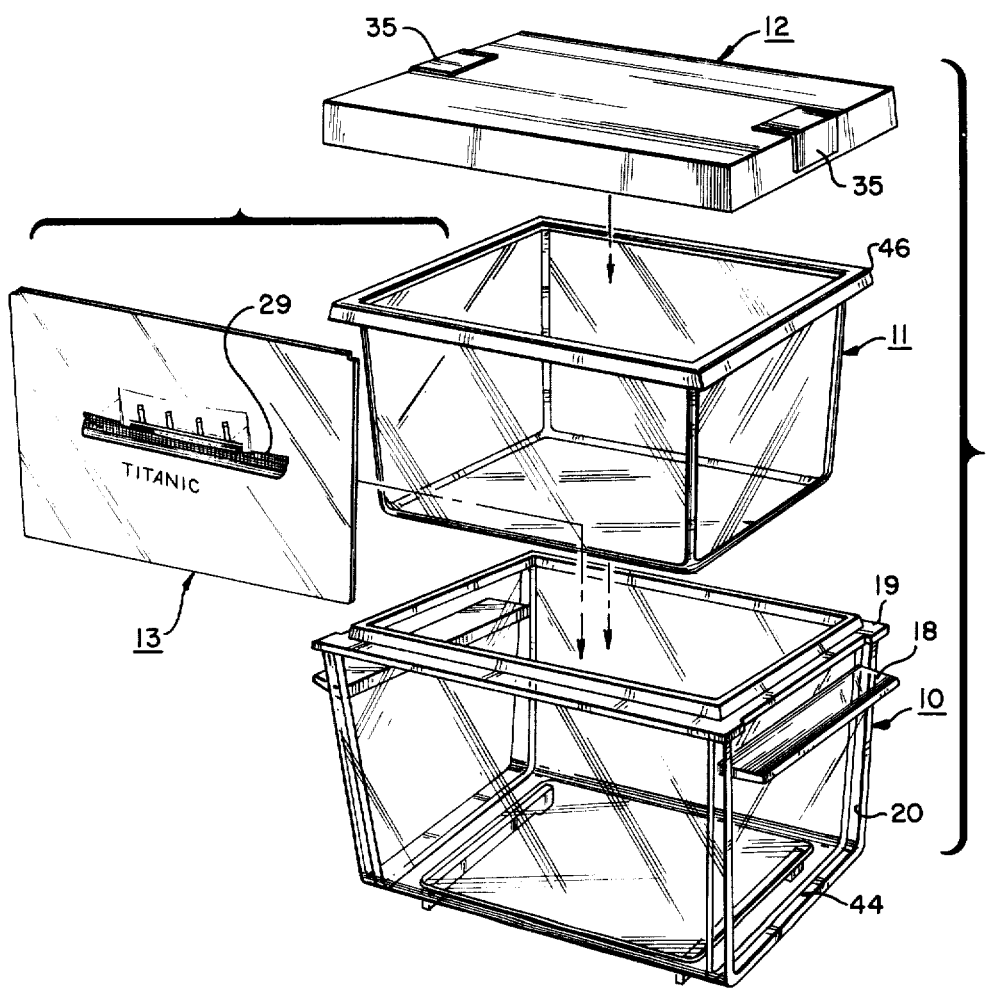
FIG. 3 is an exploded perspective view of the container of the present invention.

Referring now to the drawings and, more particularly, to FIGS. 1-5, the container of the present invention shown by reference numeral 6 includes an outer container 10, an inner container 11, a cover 12, and decorative insert 13. Preferably the containers 10 and 11 are made of transparent plastic material to permit easy viewing of the contents inside the container. The outer container includes a bottom 14, having a pair of integral downwardly extending legs 15. Each leg extends across a major portion of the bottom and about parallel to the container opposing end walls 16,16.

Connecting the end walls are opposing integral side walls 17,17. It will be noted that each of the end and side walls extend upwardly and are slightly inclined outwardly. It will also be noted that each end of the opposing side walls 17,17 extend beyond their intersection with the end walls and form wall extensions 20. The wall extensions merge with coextensive opposing end extensions 44 of bottom 14 and form an attractive continuous flange-like structure about the bottom and side edges of each end wall.

Each of the side and end walls terminate in a continuous beveled top end portion 28. Extending outwardly from a point offset downwardly from the top end portion 28 is ledge 19. The ledge preferably extends continuously about the outer container periphery and provides a support surface for the cover 12 to be hereinafter described.

Extending transversely along the top portion of each end wall 16,16 below ledge 19 are handle members 18. The handle members are flat-like structures which extend outwardly from the end walls a distance sufficient to allow one to grasp and carry the container.

The inner container 11 has a bottom 21 with integral upwardly extending end walls 22,22 and side walls 23,23. The bottom end walls are so dimensioned that they can fit inside the outer container 10 in the manner shown in FIGS. 4 and 5. Note that the inner and outer container walls and bottoms are spaced-apart from each other to provide an insulating chamber 24.

Figure 6:
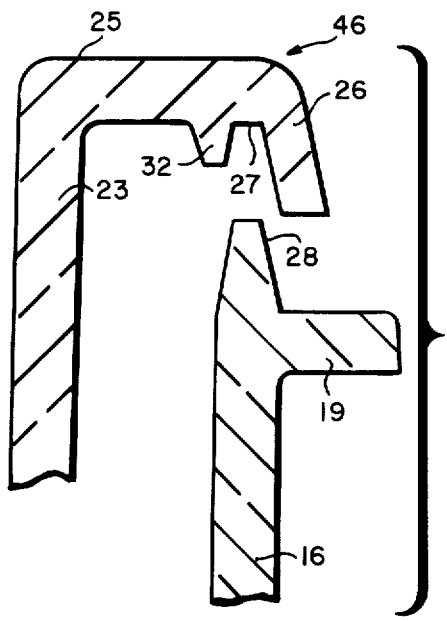
FIG. 6 is an enlarged disassembled view taken on line 6 of FIG. 5.

As best shown in FIG. 6, the inner container wall structures merge into a continuous outwardly extending rim structure 46 having a downwardly inclined lip portion 26. The rim structure includes an upper flat surface 25 and a rib 32 projecting downwardly from the underside of the rim. The rib is spaced apart from the inner surface of the lip portion 26 to define a channel 27 into which may be inserted the top end portion 28. The rib is beveled on its outer surface to matchingly engage the beveled surface of the top end portion.

Figure 4:
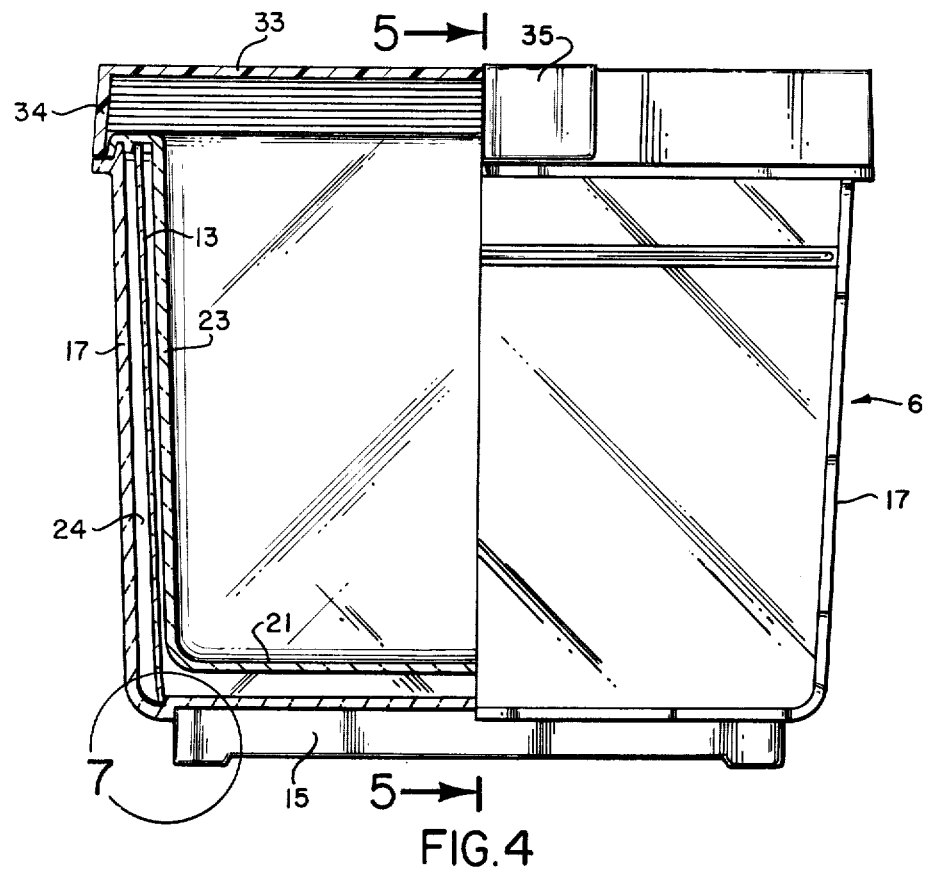
FIG. 4 is a cross-sectional view taken on line 4—4 of FIG. 2.
Figure 5:
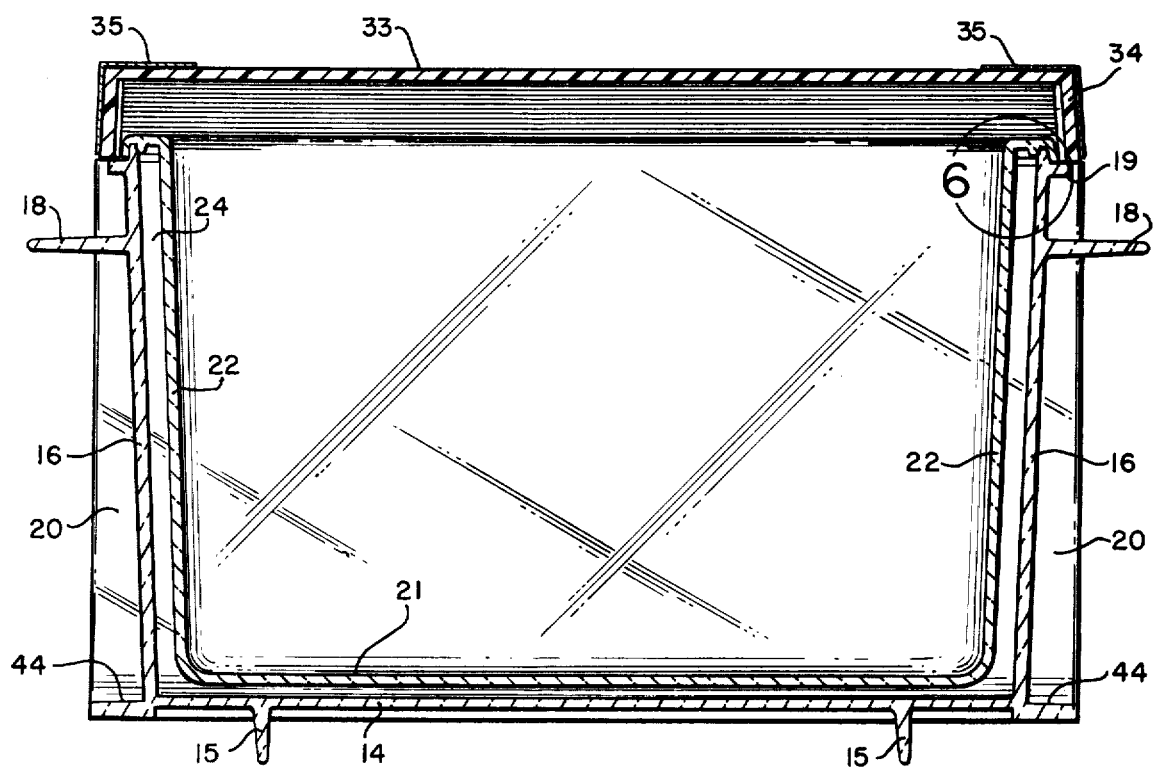
FIG. 5 is a cross-sectional view taken on line 5—5 of FIG. 4.
Figure 7:
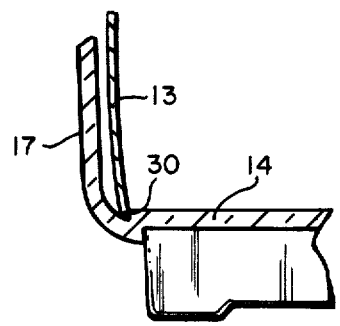
FIG. 7 is an enlarged view taken on line 7 of FIG. 4.
Figure 8:
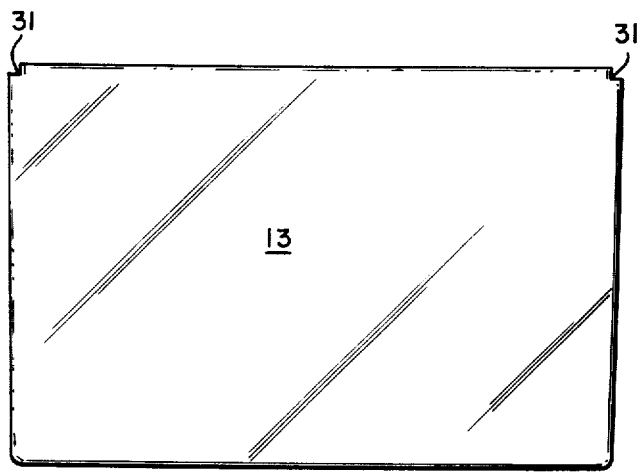
FIG. 8 is a front view of a plastic sheet which functions as the decorative material in the container of the present invention.

Referring now to FIGS. 4, 7 and 8, the decorative insert 13 and its assembly will be described. The insert is preferably a die cut thin sheet of transparent plastic having various decorative materials printed upon it. Reference numeral 29 refers to a famous ship as an example of the type of material that can be printed on the insert for eye appeal.

The insert is provided with upper corner notches 31 which accommodate the rib 32 when the insert is placed between the inner and outer container walls. The bottom edge of the insert engages elongated undercuts 30 which are located along one or both of the rounded inside bottom corners of sidewalls 17,17. It will be appreciated that the undercuts are optional and may be included along the end wall bottom inside corners when a user wishes to include inserts along one or both of the end walls.

The insert is dimensioned such that it is slightly flexed when positioned between the underside of rim 46 and undercut 30. In this manner the decorative material 13 is held in an immovable position after assembly of the inner and outer containers. After the decorative insert is placed between the walls in the manner shown in FIG. 4, the top end portion 28 is inserted into channel 27. Preferably, this connection is made permanent with the application of glue, sonic welding or solvent bonding. However, because of the close fitting beveled surfaces, it is possible not to bond the containers together and still retain the advantage of a double-walled insulated container. This allows a user to change the decorative insert 13 to achieve various effects.

The cover 12 includes a top wall 33 with peripheral downwardly extending walls 34. The lower edges of walls 34 rest on continuous ledge 19 to close the top opening of the container. Decorative overlays 35 can be optionally located at opposing ends to give the container an overall appealing appearance.

While I have described a preferred embodiment of my invention, it is apparent that other modifications may be made without departing from the spirit and scope of the invention. Accordingly, it is to be understood that the invention is only limited by the scope of the appended claims.

I claim:

1. A double-walled container comprising an outer container having a bottom and integral upstanding peripheral walls terminating at a top end, an inner container having a bottom and integral upstanding peripheral walls merging into a continuous top rim extending horizontally outwardly therefrom and turning downwardly into an inclined peripheral lip portion, the underside of said rim including a downwardly projecting rib forming a channel with said lip portion; said inner container located inside said outer container with the top end of said outer container inserted in said channel, the upstanding peripheral walls and bottom of the outer container being spaced apart from the upstanding peripheral walls and bottom of the inner container with at least part of the peripheral walls of the outer container being transparent; a decorative insert positioned between the spaced apart peripheral walls to be viewed through said transparent part said outer container upstanding peripheral walls including an outwardly extending peripheral ledge located below said top end, and a cover located over the container and supported by said ledge.

2. The container of claim 1 wherein said outer container bottom includes elongated undercut portions along inside corners of said peripheral walls, said undercut portions engaging the bottom edge of said decorative insert.

3. The container of claim 1 wherein said outer container peripheral walls include opposing sidewalls and end walls whereby said sidewalls and corresponding opposing bottom ends extend outwardly a predetermined distance beyond their intersection with said end walls.

4. The container of claim 1 wherein said insert is a flexible plastic sheet which extends between the outer container bottom and the underside of said inner container rim.

5. The container of claim 1 wherein said outer container bottom includes integral elongated downwardly extending leg members.

* * * * *